United States Patent Office 3,728,292
Patented Apr. 17, 1973

3,728,292
POLYAMIDES FOAMED WITH N-SUBSTITUTED CARBAMIC ESTER BLOWING AGENTS
Harry McGrath, Raymond Frederick Moore, and Eric Smith, Manchester, England, assignors to Imperial Chemical Industries Limited, London, England
No Drawing. Continuation of abandoned application Ser. No. 834,897, June 19, 1969. This application July 16, 1971, Ser. No. 163,454
Claims priority, application Great Britain, June 27, 1968, 30,757/68
Int. Cl. C08g 53/08
U.S. Cl. 260—2.5 N
12 Claims

ABSTRACT OF THE DISCLOSURE

Manufacture of rigid nylon foam by the use of N-substituted carbamic esters as blowing agents, especially the carbamic esters from bis-isocyanates and monofunctional alcohols and those from heterocyclic NH compounds and alkyl chloroformates.

This is a continuation of U.S. application of McGrath et al., Ser. No. 834,897, filed June 19, 1969, now abandoned.

This invention relates to the manufacture of polyamide foams.

The term polyamide refers to the thermoplastic polymers which are obtained by polycondensation of diamines with dicarboxylic acids, or self-condensation of amino acids or lactams. More particularly it refers to those linear polyamides which have fibre-forming characteristics and are termed "nylon." Specifically it includes:

polyhexamethylene adipamide (nylon 6:6)
polycaprolactam (nylon 6)
polydodecanolactam (nylon 12)
polyhexamethylene sebacamide (nylon 6:10)
polyhexamethylene isophthalamide (nylon 6:iP)
polyhexamethylene terephthalamide (nylon 6:T)
poly-metaxylylene adipamide (nylon MXD:6)

and copolymers therefrom.

Many foamed plastic materials are known and some, for example foamed polystyrene, are now in widespread use for decorative and insulation purposes. Despite the ready availability of polyamides (nylons) particularly nylon 6.6 it is remarkable that foams have not yet been produced commercially from these materials. One of the difficulties encountered in producing satisfactory foamed polyamides is the inherent unsuitability of the blowing agents which are used with other plastic materials. With polyamides these blowing agents usually give comparatively poor results. It is not possible to select blowing agents for nylon by reference to the intrinsic properties of known compounds, for characteristics such as the rate of gas production and the length of any induction period are much affected by the nylon itself.

According to the invention a process for the manufacture of rigid polyamide foam comprises heating a polyamide above its melting point with a blowing agent comprising an N-substituted carbamic ester in which the substituent is linked at a carbon atom.

In the process of the invention it is preferred to use a polyamide of high molecular weight since polyamides of low molecular weight have low melt viscosities which tend to render the foam unstable, and adequate build-up of molecular weight (and hence melt viscosity), through normal polycondensation is not achieved in the duration of the foaming process. The relative viscosity of the preferred high molecular weight polyamides (as measured on an 8.4% by weight solution in 90% formic acid/water) is at least 20 and preferably 40 to 50.

If desired, however, polyamides of lower molecular weight can be used in the process of the invention, though it is desirable in such cases to carry out the heating in presence of a cross-linking agent to increase the molecular weight.

Blowing agents used in the process of the invention may be of the formula:

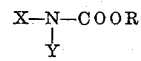

wherein X is a radical of the aliphatic, alicyclic, aromatic or araliphatic series, Y is hydrogen or a radical of the aliphatic, alicyclic, aromatic or araliphatic series or X and Y together represent the atoms necessary to complete with the nitrogen atom a heterocyclic system, and R is a radical of the aliphatic, alicyclic or araliphatic series.

Examples of aliphatic, alicyclic, aromatic, and araliphatic radicals which X and Y may represent are alkyl radicals of 1 to 20 carbons, e.g. ethyl, hexyl, dodecyl radicals, phenyl radicals, phenylethyl radicals. All such radicals may be substituted, for example by —NHCOOR groups. Examples of heterocyclic systems which may be formed by X and Y and the nitrogen atoms are carbazole and its partially reduced analogues e.g. 1,2,3,4-tetrahydrocarbazole, 1,3-imidazole, benzimidazole, pyrazole and indazole.

Radicals represented by R may be for example methyl, ethyl, n-propyl, isopropyl, n-butyl, isobutyl, t-butyl, or n-dodecyl radicals; cyclohexyl; benzyl or phenylethyl radicals.

Blowing agents for use in the process are obtainable by interaction of (a) An isocyanate, which may be mono- or polyfunctional and may be aliphatic or aromatic in character. The preferred isocyanates are di-isocyanates, especially aliphatic di-isocyanates; examples of di-isocyanates are tolylene diisocyanate, diphenylmethane diisocyanate and especially hexamethylenediisocyanate.

Polymeric isocyanates, for example the trimer of toluylene diisocyanate which has three functional isocyanate groups are also suitable.

(b) A monofunctional aliphatic alcohol which may be primary, secondary or tertiary. Lower aliphatic alcohols (i.e. containing up to 5 carbon atoms) are preferred since the urethanes therefrom decompose with formation of compounds a high proportion of which are gaseous at the temperature of heating, and therefore produce the greatest expansion. In particular the urethanes from tertiary alcohols e.g. tertiary butanol evolve a portion of the corresponding iso-olefines which, being gaseous throughout the entire operation, produce very good foam expansion.

By varying the isocyanate and alcohol components of the N-substituted carbamic acid alkyl ester, a range of compounds with various decomposition temperatures can be achieved from which suitable blowing agents for a wide variety of polyamides of different melting points can be selected.

Blowing agents for use in the process may also be obtained by interaction of alkyl chloroformates with compounds containing —NH— groups. This method is particularly applicable to those blowing agents of the above formula wherein X and Y together with the nitrogen atom complete a heterocyclic system. Thus blowing agents may be formed for example from alkyl chloroformates and the heterocyclic compounds carbazole, 1,2,3,4-tetrahydrocarbazole, 1,3-imidazole, benzimidazole, pyrazole, indazole, and benzotriazole.

The proportion of blowing agent relative to polyamide may be for example from 0.1 to 10% by weight depending upon the particular blowing agent and polyamide used and the density of foam wanted. In general proportions of 0.5 to 3% by weight are preferred.

To carry out the process polyamide in powder, chip or granule form may be mixed with the blowing agent and subsequently heated above the melting point until foaming occurs. Alternatively the blowing agent can be introduced into an already molten polyamide. Conveniently heating of a mixture of polyamide and blowing agent may be commenced in an extruder from which the mixture is extruded into a heated mould in which foaming takes place.

If desired a surface active agent, preferably of the non-ionic type, may be present during heating of the polyamide and blowing agent in order to preserve a fine dispersion of gas bubbles during the sharp transition to rigid foam. The use of surface active agents for this purpose is within the claims of our United Kingdom Pat. No. (application No. 26,793/67). Some of the most effective surface active agents are long chain alkylphenols, alkanols or alkylamines containing at least 6 carbon atoms, and condensates thereof with an alkylene oxide preferably containing from 1 to 30 moles of alkylene oxide. Especially effective surface active agents are alkanols containing 10 to 20 carbon atoms e.g. cetyl alcohol and condensates of such alcohols with up to 5 moles of alkylene oxide e.g. ethylene oxide. The product of this type which is sold by Imperial Chemical Industries Limited under the name Lubrol MOA (a condensate of cetyl and oleyl alcohols with about 2.5 moles of ethylene oxide having a molecular weight of about 350) (registered trademark) is particularly effective. Other especially effective surface active agents are condensates of alkylamines, containing 10 to 20 carbon atoms, with up to 5 moles of alkylene oxide e.g. ethylene oxide. These surface active agents have the additional advantage of accelerating decomposition of the urethane blowing-agent, thus causing more rapid foaming. The product of this type which is sold by Armour Hess Chemicals Ltd. under the name Ethomeen S/12 (a condensate of soya amine with about 2 moles of ethylene oxide of average molecular weight 350) is particularly effective.

Rigid polyamide foams produced by the invention are light in weight but have good strength. They have potential for use in the manufacture of a variety of light-weight load-bearing structures, for example in the building and furniture industries.

It is an advantage of the invention that any isocyanate which may be produced in the blowing operation is available for linking with the polyamide. When a polyfunctional isocyanate is produced cross-linking of the polyamide may take place thereby improving the strength of the foam.

The invention is illustrated but not limited by the following examples in which all percentages are by weight, and all relative viscosities are measured on an 8.4% solution in 90% formic acid/water.

EXAMPLE 1

Nylon 6.6 (25 g.) having a relative viscosity of 50 and Lubrol MOA (0.5 ml.) were heated under nitrogen in a glass tube in a vapour bath at 280° C. until molten and stirred for 10 minutes. 1,6-bis(isopropoxycarbonylamino)hexane (0.5 g.) was added and the mixture stirred for 30 seconds before removing the stirrer. Foaming commenced immediately. After 4 minutes, heating was discontinued and the foam allowed to cool.

The cylinder of foam obtained was extremely tough, had fine even texture and excellent white colour; average density was 0.18 g./cc.

In place of 1,6-bis(isopropoxycarbonylamino)hexane in this example the following may be used:

Ethoxycarbonylaminododecane, 4,4' - bis(isopropoxycarbonylamino)diphenylmethane, or the mixture of bis-isopropoxycarbonylamino compounds obtained by reacting isopropanol with the commercially available mixture of toluylene diisocyanates known as TDI.

EXAMPLE 2

Nylon 6.6 of relative viscosity 50 and Lubrol MOA (6 ml.) were melted under nitrogen in a wide glass tube (diam. 10 cms.) heated to 290° C. After stirring for 5 minutes the temperature of the melt was lowered to 265° C., 1,6 - bis(methoxycarbonylamino)hexane (3 g.) was added, the mixture stirred for 1 minute and the stirrer removed. Heating was discontinued 2 minutes later and the foam allowed to cool to room temperature.

A tough white block of foam was obtained with average density 0.2 g./cc.

EXAMPLE 3

Using the same general procedure as in Example 2, nylon 6.6 (150 g.) and Ethomeen S/12 (3 ml.) were melted together and stored at 265° C. 1,6-bis(methoxycarbonylamino)hexane (4.5 g.) was added, the mixture stored for 1 minute and the stirrer removed. Heating was discontinued after 5 minutes and the foam allowed to cool to room temperature. A block of foam was obtained with average density 0.07 g./cc.

EXAMPLE 4

Nylon 6.10 of relative viscosity 40 and Lubrol MOA (0.5 ml.) were melted under nitrogen at 226° C. and stirred for 5 minutes before adding 1,6-bis(isopropoxycarbonylamino)hexane (0.5 g.). After stirring for one minute the stirrer was removed and foaming allowed for 8 minutes before cooling to room temperature. The foam obtained had good texture with average density 0.25 g./cc.

EXAMPLE 5

To a stirred mixture of molten nylon 6iP (25 g.—relative viscosity 40) and Lubrol MOA (0.5 ml.) at 226° C. was added 1,6 - bis(tert - butoxycarbonylamino)-hexane (0.5 g.). After stirring for ½ minute, the stirrer was removed and the mixture allowed to foam for 5 minutes before discontinuing the heating. On cooling, a foam was obtained with very fine texture and excellent colour; average density 0.12 g./cc.

EXAMPLE 6

Example 5 was repeated using nylon 6 of relative viscosity 40 instead of nylon 6iP. Foaming took place during 7 minutes and the product was then allowed to cool to room temperature. The foam had good colour and texture and was slightly elastic; average density 0.19 g./cc.

EXAMPLE 7

Nylon 6.6 granules (the moulding grade Maranyl A100—as sold by Imperial Chemical Industries Limited—this has a relative viscosity of 50) were coated with 2% Lubrol MOA and 2% 1,6-bis(isopropoxycarbonylamino)-hexane by tumbling on a roller mill. This material was fed to a ¾ inch diameter single screw extruder (length: diameter 24:1) having a temperature profile 270° C. at the feed end, 285° C. in the metering section and 265° C. at the die. The extrudate was passed under nitrogen at the maximum rate of 30 g./min. to an open cylindrical metal mould (diam. 11 cms.) heated to 265° C. After 7 minutes the feed was stopped and the mould allowed to cool to room temperature. A block of foam was obtained with average density 0.16 g./cc.

EXAMPLE 8

Ethyl carbazole-9-carboxylate (1 g.) was added to molten 6.6 nylon and Ethomeen S/12 (0.5 ml.) at 280° C. in the manner described in Example 1 and the mixture allowed to foam during 2 minutes. On cooling a tough, cream coloured block of foam was obtained with average density 0.15 g./cc.

Analogous blowing agents which may be used with similar results include:

isopropyl 1,2,3,4-tetrahydrocarbazole-9-carboxylate ethyl, 1,3-imidazole-1-carboxylate
isoamyl 3-methylpyrazole-1-carboxylate

EXAMPLE 9

The tri(methylcarbamic ester) was made from methanol and the isocyanurate trimer of toluylene diisocyanate. 0.5 g. of this ester was added to 25 g. of molten nylon 6.6 and 0.5 ml. Lubrol MOA at 280° C. described in Example 1, and the mixture was allowed to foam during 20 minutes. On cooling a tough, white block of foam with average density 0.3 g./cc. was obtained.

We claim:
1. A process for the manufacture of rigid polyamide foam which comprises heating
   (a) a polyamide having repeating carbonamide groups as an integral part of the polymeric chain, whereof the relative viscosity as measured on an 8.4% solution in 90% formic acid/water is at least 20,
   with (b) a blowing agent of the formula:

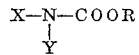

wherein X and Y are selected from the class consisting of aliphatic, alicyclic, aromatic and araliphatic radicals (and in the case of Y, hydrogen atoms) and aliphatic, alicyclic, aromatic and araliphatic radicals carrying an —NHCOOR group, and interlinked radicals which, together with the nitrogen atom complete a heterocyclic system, and R is selected from the class consisting of aliphatic, alicyclic, aromatic and araliphatic radicals,
   the proportion of (b) relative to (a) being from 0.1 to 10% by weight, said heating being carried out above the melting point of the polyamide,
   and cooling to solidify the foam produced by said heating.
2. Process according to claim 1 wherein Y represents hydrogen and X represents an aliphatic, alicyclic, aromatic or aromatic radical which carries an —NHCOOR group.
3. Process according to claim 2 wherein X represents the group —(CH$_2$)$_6$NHCOOR.
4. Process according to claim 1 wherein R represents an alkyl radical of up to 5 carbon atoms.
5. Process according to claim 2 wherein R represents an alkyl radical of up to 5 carbon atoms.
6. Process according to claim 3 wherein R represents an alkyl radical of up to 5 carbon atoms.
7. Process according to claim 1 wherein R represents a tertiary alkyl group.
8. Process according to claim 2 wherein R represents a tertiary alkyl group.
9. Process according to claim 3 wherein R represents a tertiary alkyl group.
10. Process according to claim 1 wherein the heating is carried out in the presence of a non-ionic surface active agent selected from the class consisting of alkyl phenols, alkanols and alkylamines containing at least 6 aliphatic carbon atoms and condensates thereof with from 1 to 30 moles of an alkylene oxide.
11. Process according to claim 10 wherein the surface active agent is a condensate of an alkanol containing 10 to 20 carbon atoms with up to 5 moles of alkylene oxide.
12. Process according to claim 10 wherein the surface active agent is a condensate of an alkylamine containing 10 to 20 carbon atoms with up to 5 moles of alkylene oxide.

References Cited
UNITED STATES PATENTS

| 3,376,237 | 4/1968  | Fuller       | 260—2.5 N |
| 3,554,937 | 1/1971  | Cadus        | 260—2.5 N |
| 3,041,294 | 6/1962  | Becke        | 260—2.5 N |
| 3,065,189 | 11/1962 | Becke        | 260—2.5 N |
| 3,274,132 | 9/1966  | Giberson     | 260—2.5 N |
| 3,322,696 | 5/1967  | Fisher       | 260—2.5 N |
| 3,382,195 | 5/1968  | Gilch        | 260—2.5 N |
| 3,448,085 | 6/1969  | Pietruscza   | 260—2.5 N |
| 3,547,836 | 12/1970 | Brueggemann  | 260—2.5 N |
| 3,574,146 | 4/1971  | Schnell      | 260—2.5 N |
| 3,600,336 | 8/1971  | Okada        | 260—2.5 N |
| 3,663,670 | 5/1972  | Swayne       | 260—2.5 N |
| 3,679,613 | 7/1972  | Gilch        | 260—2.5 N |

FOREIGN PATENTS 1,112,515  5/1968  Great Britain _____ 260—2.5 N

PAUL LIEBERMAN, Primary Examiner

U.S. Cl. X.R.
260—77.5 TB, 78 R